(12) United States Patent
Gutierrez et al.

(10) Patent No.: US 8,569,666 B2
(45) Date of Patent: Oct. 29, 2013

(54) METHOD FOR DETECTING THE PAN SIZE IN INDUCTION COOKING HOBS AND INDUCTION COOKING HOB FOR CARRYING OUT SUCH METHOD

(75) Inventors: Diego Neftali Gutierrez, Varese (IT); Fabrizio Dughiero, Piove di Sacco (IT)

(73) Assignee: Whirlpool Corporation, Benton Harbor, MI (US)

( * ) Notice: Subject to any disclaimer, the term of this patent is extended or adjusted under 35 U.S.C. 154(b) by 451 days.

(21) Appl. No.: 12/687,366

(22) Filed: Jan. 14, 2010

(65) Prior Publication Data

US 2010/0181304 A1    Jul. 22, 2010

(30) Foreign Application Priority Data

Jan. 16, 2009  (EP) ..................................... 09150693

(51) Int. Cl.
*H05B 6/12* (2006.01)
(52) U.S. Cl.
USPC ........... 219/626; 219/620; 219/621; 219/622; 219/623; 219/624; 219/625; 219/627

(58) Field of Classification Search
USPC .................................................. 219/620–627
See application file for complete search history.

(56) References Cited

U.S. PATENT DOCUMENTS

| 4,319,109 | A |   | 3/1982  | Bowles |        |
|-----------|---|---|---------|--------|--------|
| 4,447,691 | A | * | 5/1984  | Mizukawa et al. | 219/626 |
| 6,633,023 | B2 | * | 10/2003 | Cornec et al. | 219/624 |

FOREIGN PATENT DOCUMENTS

| DE | 19502935 A1 | 8/1996 |
| GB | 2055030 A   | 2/1981 |

OTHER PUBLICATIONS

European search report for corresponding EP09150693.1, Aug. 3, 2009.

\* cited by examiner

*Primary Examiner* — Matthew W Such
*Assistant Examiner* — Robert Carpenter

(57) ABSTRACT

A method for detecting the pan size and/or position in induction cooking hobs comprises providing at least a sensing circuit associated to a magnetic field concentrator, particularly a ferrite bar, and assessing an electrical parameter thereof correlated to the variation of the magnetic flux.

17 Claims, 10 Drawing Sheets

METHOD FOR DETECTING THE PAN SIZE IN INDUCTION COOKING HOBS AND INDUCTION COOKING HOB FOR CARRYING OUT SUCH METHOD

BACKGROUND OF THE INVENTION

1. Field of the Invention

The present invention relates to a method for detecting pan size and/or position in induction heating hobs, and particularly to induction heating hobs comprising an induction coil and a plurality of magnetic field concentrators, particularly ferrite bars or the like, positioned below the induction coil. The invention also relates to an induction heating hob adapted to implement the above method.

2. Description of the Related Art

It is well known in the art of cooking appliances the need of correctly assessing the size and/or position of a cooking utensil (in the following identified generally as "pan"), particularly for alerting the user when a pan is not properly centered on the heating element and/or for automatically driving the heating element according to the size/and/or position of the pan.

Methods for pan detection in induction cooking appliances by using electrical parameters of the system (considering the system as a combination of a power converter and an induction coil linked to a pan) are well known, but while they are adequate to detect if a pan is present or not, they cannot be used to estimate pan size and/or position with meaningful precision for real life applications.

Several electrical parameters can be used for the pan detection: power factor of the load, power factor of the coil, absorption of line current, etc.

The information on pan size and/or pan position would improve the hob control by allowing more balanced power supply, especially for pans heated by multiple coils and for enhanced cooking functions, requiring water/food quantity estimation.

The basic structure of an induction heating system comprises a power converter connected to an induction coil, thus every induction heater includes a means to monitor some electrical magnitude of the power converter. This information can be also used for the basic pan detection function mentioned above (pan present or not), but it is almost useless for estimating further details about the pan, like pan size or pan position, without the use of additional sensors.

SUMMARY OF THE INVENTION

An aspect of the present disclosure is to propose a method for detecting the pan size and/or pan position on the induction coil which is simple and reliable. Another aspect of the present invention is to provide an induction heating hob in which the size and/or the position of any cooking utensil placed on it can be assessed in a simple and reliable way without sensibly increasing the cost of the appliance.

The above aspects are reached thanks to the features listed in the appended claims.

The present disclosure is based on the idea of sensing the magnetic field flux applying a sensor, and preferably a sensor on a component that is already present in any standard induction heating coils, i.e. the magnetic field concentrators in the form of ferrite bars commonly placed under the coils, and measuring a parameter correlated to pan size and position.

Figure 1:
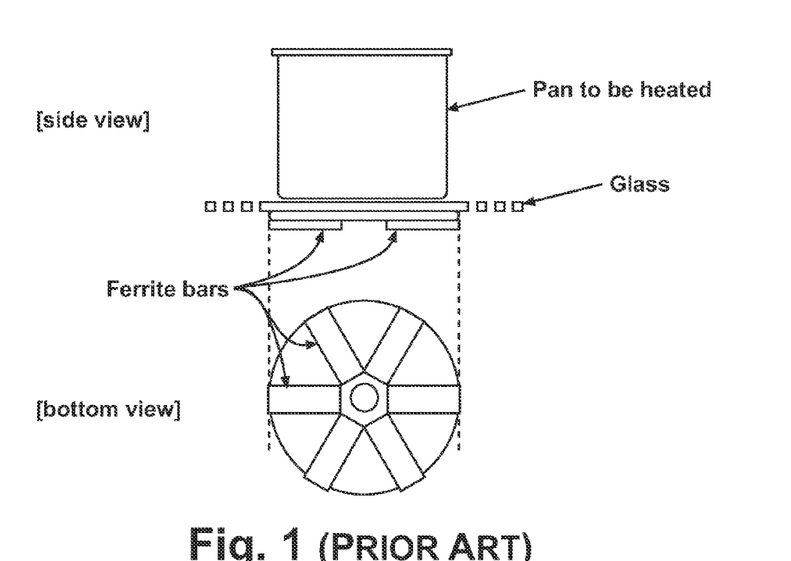
FIG. 1 is a typical configuration of the coil of an induction heating hob provided with ferrite bars.

FIG. 1 shows a typical configuration of the coil of an induction heating hob provided with ferrite bars. Ferrites are non-conductive ferromagnetic ceramic compounds derived from iron oxides such as hematite or magnetite as well as oxides of other metals. The high electrical resistance of the ferrite leads to very low eddy current losses.

Since ferrite bars have the function of magnetic field concentrators, when the coil is active ferrite bars are linked to a strong magnetic field. Field magnitude within the ferrite may change because of pan size and position. According to a preferred embodiment of the invention, said filed magnitude can be easily measured by adding a conductive wire wrapped around the ferrite, and measuring the voltage induced on this wire, that is proportional to the ferrite magnetic field variation versus time. Even if the configuration of the wire wrapped around the ferrite bar is the preferred one, other configurations of electrical circuits associated with the ferrite bars may be used as well. The sensing electric circuit may be also a simple coil (or a plurality of turns) not necessarily wrapped around a ferrite bar or similar magnetic field concentrator. This coil (acting as a sort of "antenna") is affected by the magnetic field variations and can provide related signals as well.

This new signal from such auxiliary electrical circuit made of said wrapped wire can be acquired by the control system of the induction heating system, which is typically equipped with a microcontroller with A/D converters. The microcontroller can elaborate the signal with a predetermined algorithm and estimate pan size and position. Control system can then take advantage of this information, improving the power supply (especially for pans heated by multiple coils) and enhancing custom cooking functions requiring water or food quantity estimation.

BRIEF DESCRIPTION OF THE DRAWINGS

Further advantages and features according to the present disclosure will be clear from the detailed technical description, with reference to the attached drawings, in which.

DETAILED DESCRIPTION OF THE PREFERRED EMBODIMENTS

This disclosure proposes the use of commonly used ferrite bars to measure the magnetic field magnitude and shape under the coil. Magnetic field can be measured by adding a conductive wire wrapped around one or more ferrite bars, and by measuring the voltage induced on this wire, that is proportional to the magnetic field according to Faraday's law:

$$\varepsilon = -N\frac{d\Phi_B}{dt}$$

where $\varepsilon$ is the electromotive force (in Volts), N is the number of turns of wire and $\Phi_B$ is the magnetic flux (in Weber) through a single loop. Since the magnetic flux is generated by the alternate current flowing in the coil, the magnetic field B module and phase are related to the coil current, and, as a consequence, the voltage induced on the wire is equal to the derivative of such periodic signal and related to the voltage at coils terminals.

Figure 2:
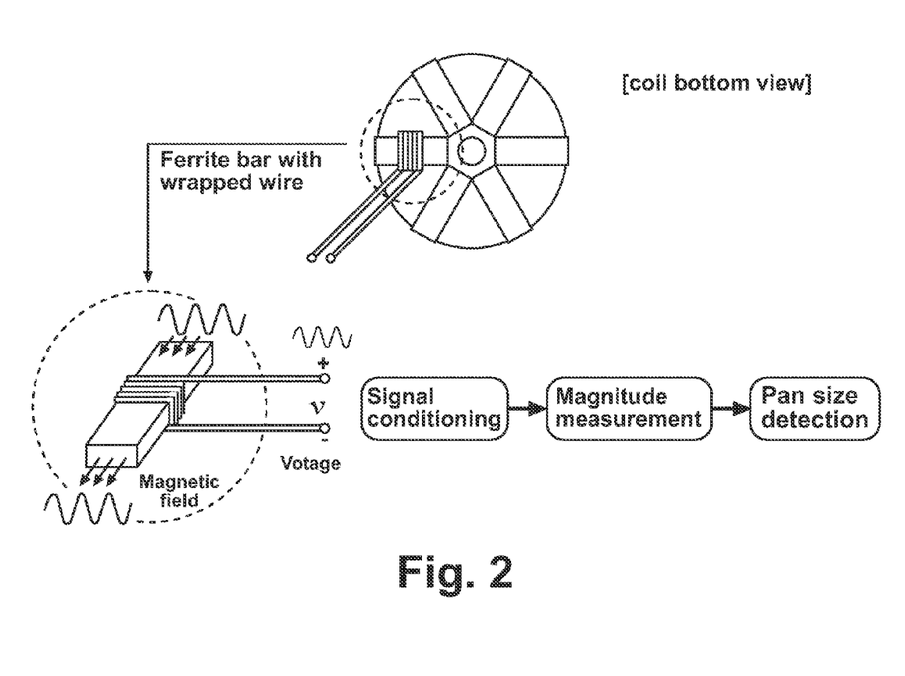
FIG. 2 is a schematic view of a induction heating coil according to the invention, with a scheme of the electrical circuit associated to a ferrite bar.

FIG. 2 shows an example of a ferrite bar with a wrapped wire and the concept scheme of the present invention.

Induction heating basic concept is to supply power from a coil to a pan through magnetic coupling. Magnetic field is generated in the coil and linked into the pan, hence the shape and magnitude of the magnetic field depends greatly on the size and position of the pan with reference to the coil, as well as the ferromagnetic characteristic of the bottom pan layer.

Figure 3:
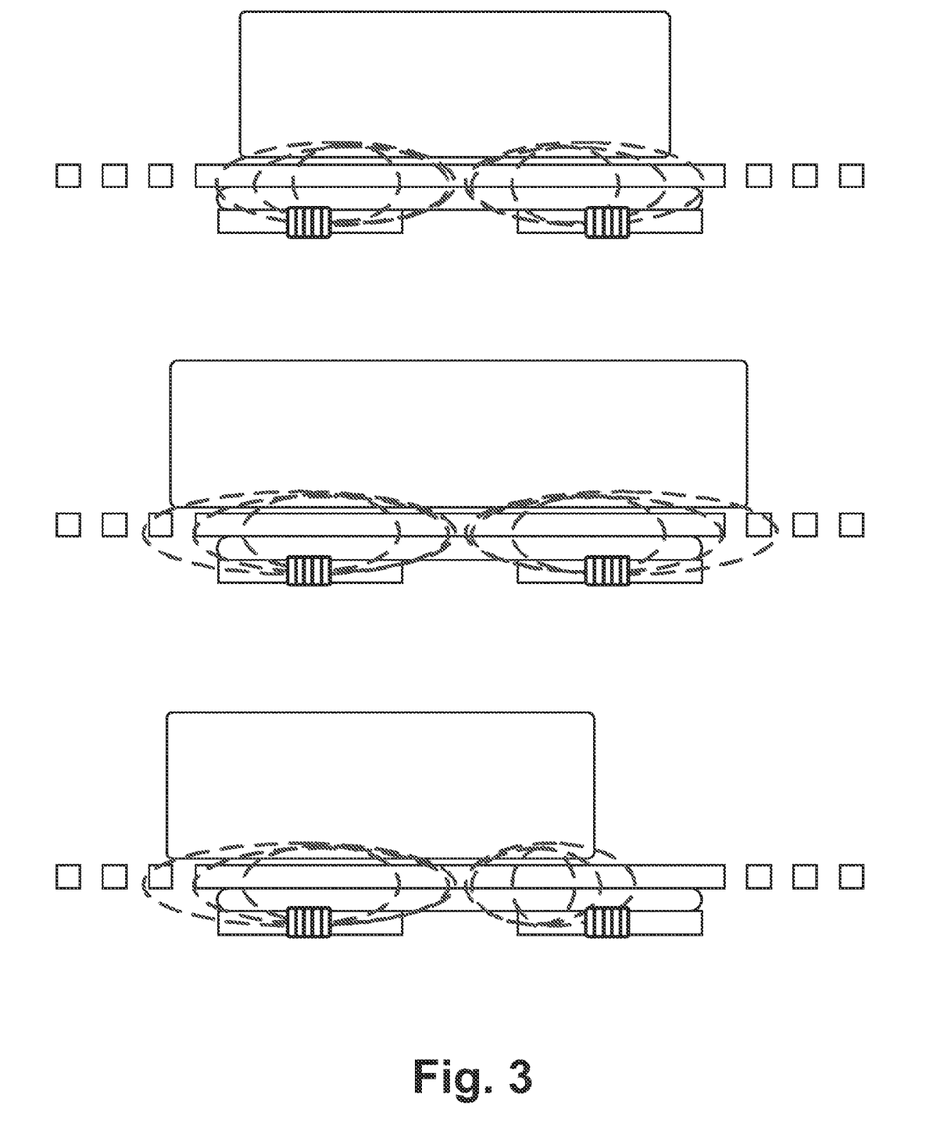
FIG. 3 is a lateral view of three different configurations showing the influence of the covering of the coil with the pan on the hob.

FIG. 3 shows schematically how pot displacement vs. inductor coil changes the magnetic fields distribution. In the upper configuration the pan is centered but it doesn't cover the entire coil surface. Magnetic field amplitude is limited within the ferrites, but there is no different signal between opposite magnetic sensor. In the middle configuration the pan is centered and covers perfectly the entire coil surface. Magnetic field amplitude is maximum within the ferrites, and there is no different signal between opposite magnetic sensor. In the lower configuration the pan is not centered and it doesn't cover the coil surface. Magnetic field amplitude is maximum within the left ferrite, instead is at minimum value within the right ferrite.

Figure 4:
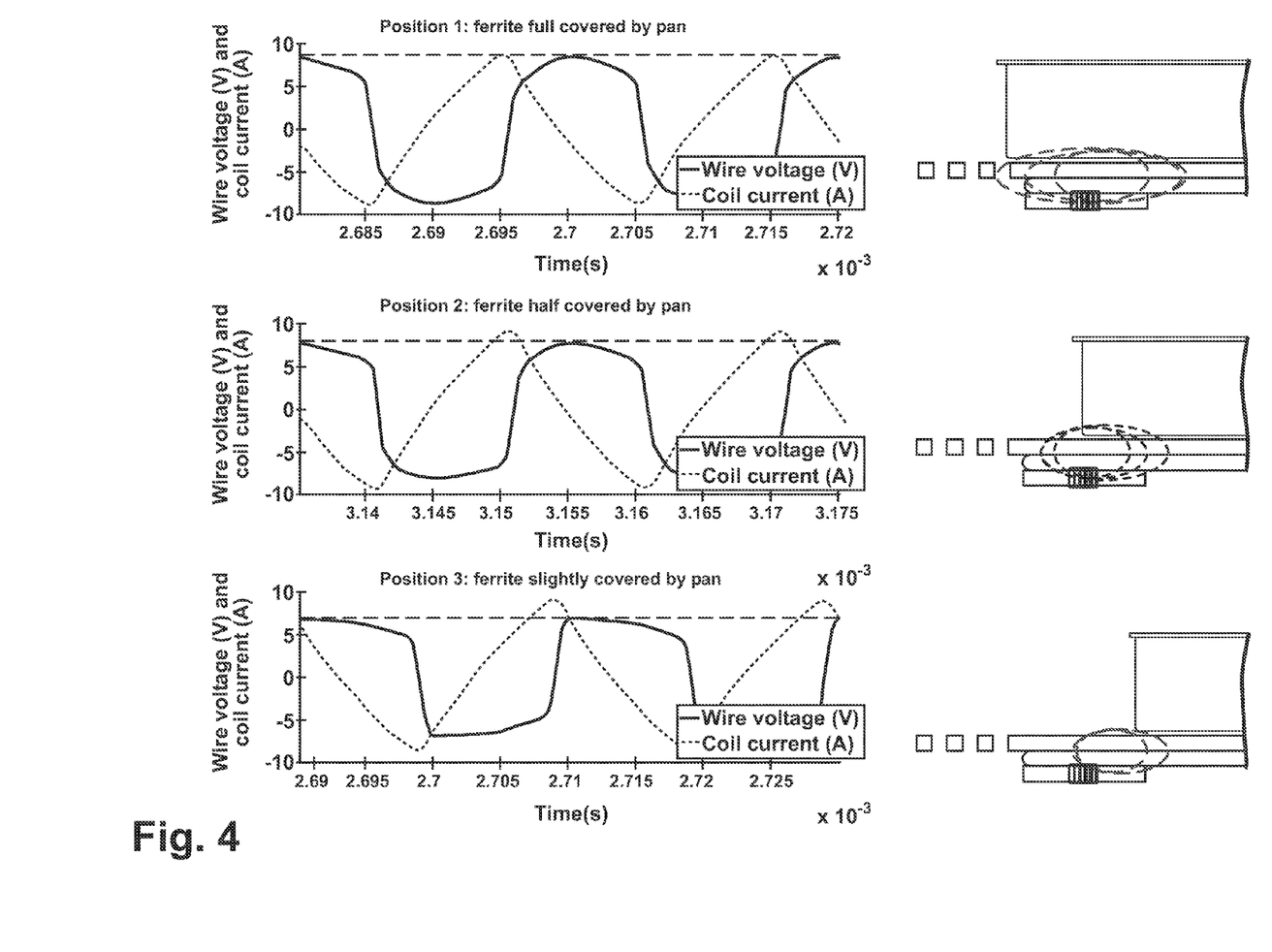
FIG. 4 is similar to FIG. 3 and shows also the electrical diagrams of induced voltage variations in respect to pan covering of the ferrite bars.

FIG. 4 shows a real measurement of the voltage induced in the wrapped wire for three different positions of the pan. Relevant factors like pan ferromagnetic layers remain constant, only pan position changes at each experiments. In the upper configuration (position 1) the ferrite sensing bar is fully covered by the pan. In the middle configuration (position 2) the ferrite sensing bar is half covered by the pan. In the bottom configuration (position 3) the ferrite sensing bar is slightly covered by the pan. In the left portion of FIG. 4, the full line in the diagrams represents the sensor output voltage, while the dotted line represents the coil current. FIG. 4 draws attention to the correlation between the portion of ferrite surface covered by the pan and the induced voltage signal. It is evident that such signal changes both in shape (more sinusoidal when the ferrite is well covered, more squared when the ferrite is slightly covered) and magnitude (peak to peak voltage decreases as the percentage of ferrite surface covered by the pan decreases). Any electrical parameter correlated to the variation of the ferrite magnetic flux can be used to estimate the portion of surface covered by the pan. Among these parameters, induced voltage Vm mean, voltage peak-to-peak and voltage signal phase can be used. Another electrical parameter is, for instance, the root mean square (RMS) value of the induced voltage. RMS value of the induced voltage can be calculated on the main period, as:

$$V_{RMS} = \sqrt{\frac{1}{T}\int_0^T v(t)^2 dt}$$

where T is the main period (10 ms at 50 Hz) and v(t) is the induced voltage signal. An even better result can be obtained by calculating RMS value of the signal only above an interval around its peak value, in order to improve sensibility.

Figure 5:
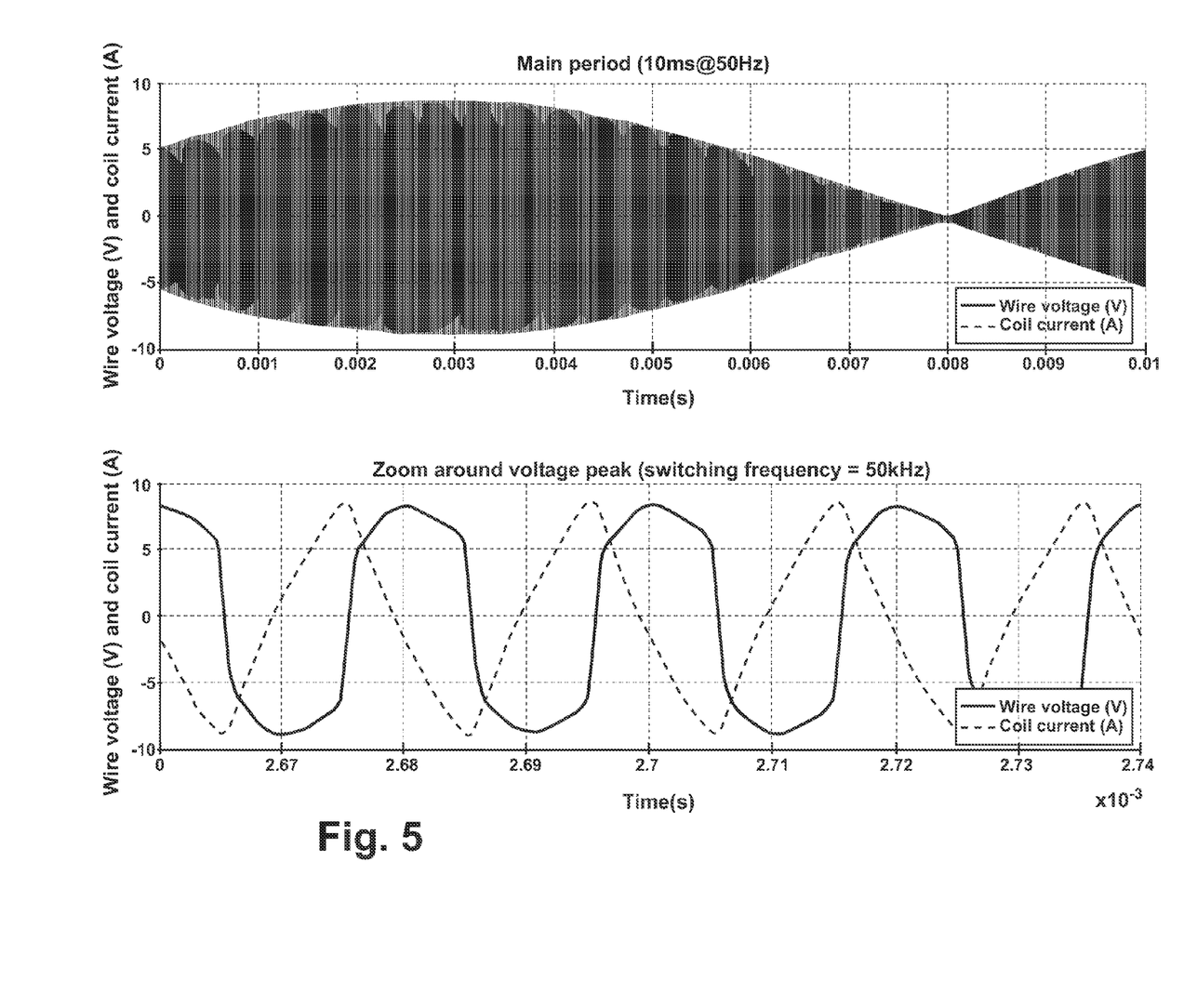
FIG. 5 shows an example of main period of voltage signal and an enlarged view of the same voltage signal around its peak value.

FIG. 5 shows a main period of the voltage signal (10 ms at 50 Hz) and an enlarged view (zoom) of the same voltage signal around its peak value (4 switching periods=4×20 μs at 50 kHz).

RMS value of induced voltage calculated on the switching period around maximum voltage peak shows a better signal-to-noise ratio than RMS value of main period.

Considering N successive switching periods around maximum voltage peak, RMS zoom value can be averaged as:

$$V_{zoom_{RMS}} = \sqrt{\frac{1}{N \cdot T_{SW}}\int_0^{N \cdot T_{SW}} v(t)^2 dt}$$

where $T_{SW}$ is the switching period ($f^1$=20 μs at 50 kHz) and v(t) is the induced voltage signal.

The parameter $Vzoom_{RMS}$ is proportional to the position of the pan and it has a maximum value when pan covers completely the area where the sensor is positioned.

Figure 6:
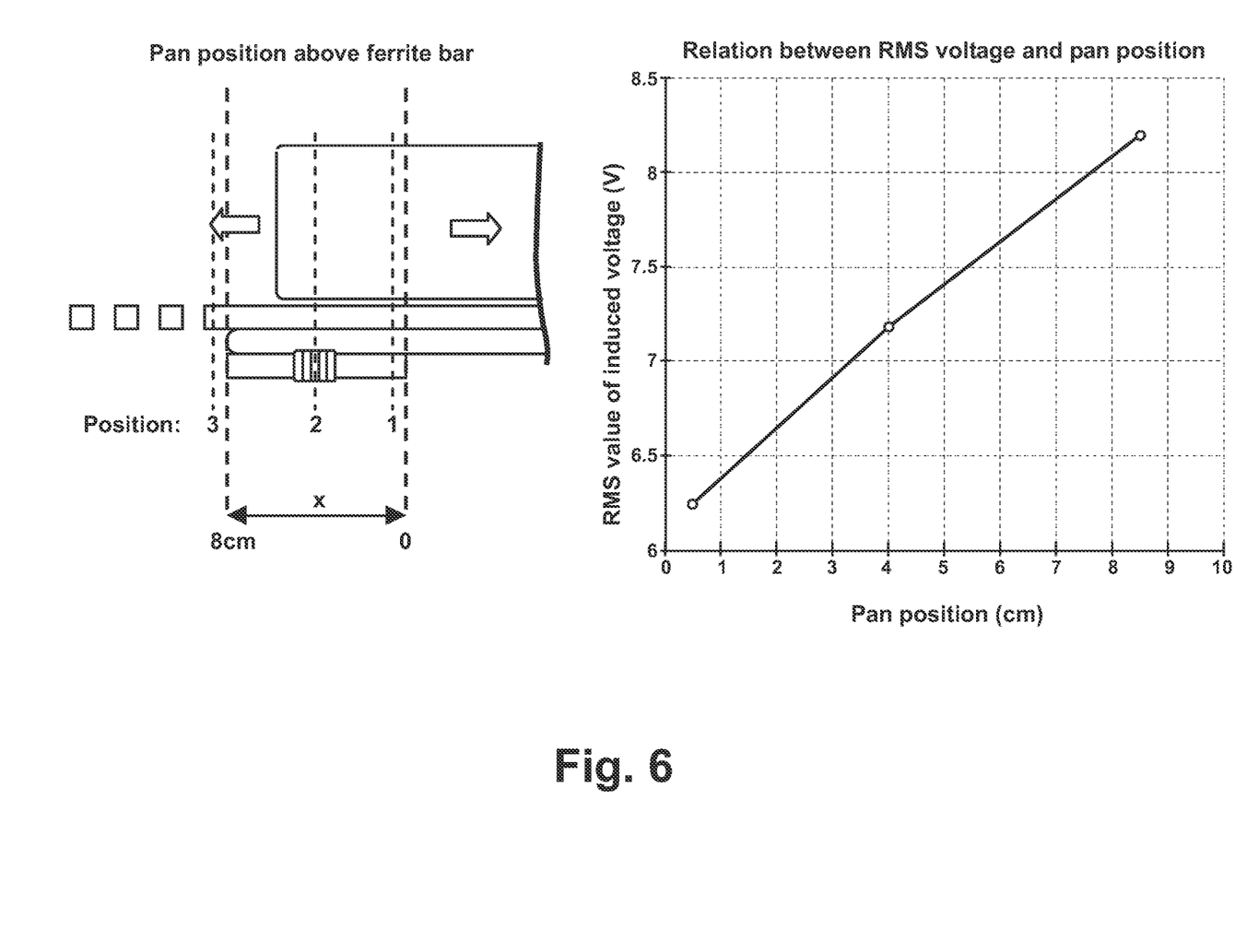
FIG. 6 shows the relationship between the root main square of the induced voltage and pan position.

FIG. 6 shows the relation between the RMS voltage and the pan position. Such relation is:

Pan_position=$k \cdot V_{RMS}$+q where k and q are functions of the coil design (mechanical and electrical spec) and the power transistor driving frequency of power converter. Since these parameters are known as they depend on the inductor coil used, then voltage variation depends actually only on the pan position along the ferrite axis.

Moreover, this sensor information combined with other electrical magnitude as the coil power factor can provide much more accurate information regarding pan size: for instance, it can be used the following relation for the pan size estimation Pan_size=$k_1 \cdot$Pan_position+$k_2$*PowerFactor where $k_1$ and $k_2$ are functions of the coil design.

Robustness of the detection against variation of pan, coil and power supply can be achieved by using more than one sensor.

There are mainly three possibilities of applying the magnetic sensor:
1. To use at least 2 sensor on the same ferrite bar.
2. To use at least 2 sensing ferrite bar, each one with one sensor, and not sharing the same axis.
3. A combination of method 1 and 2: multiple sensing ferrite bars, each one with more than one sensor.

Figure 7:
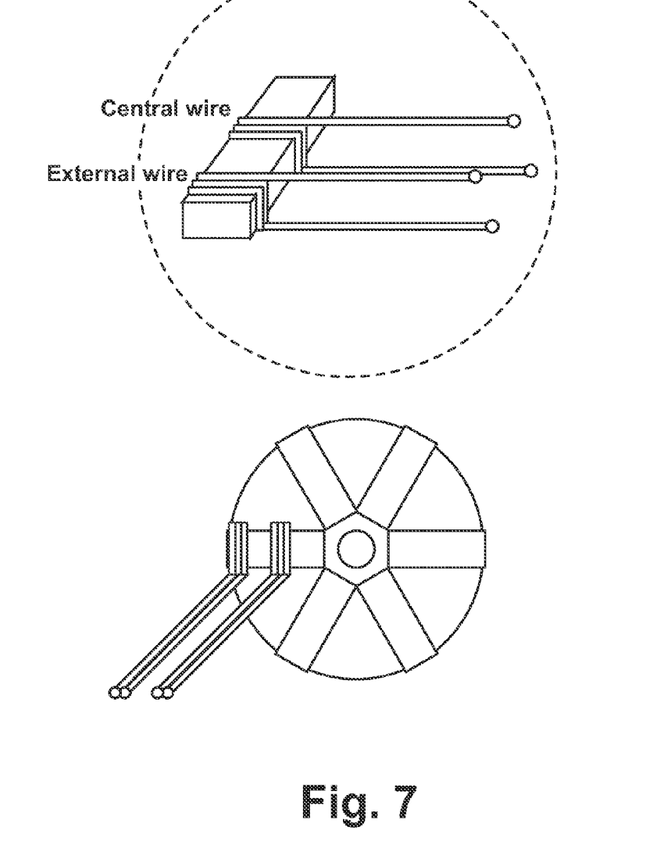
FIG. 7 is a schematic view of a second embodiment of the invention.

With reference to the first possibility (second embodiment—more than one sensor on the same ferrite bar), one example is shown in FIG. 7. According to this embodiment two wirings are mounted around the same ferrite: one at the center of the bar, where magnetic flux has the maximum value (if pot is centered and is covering the coil), and one at the extremity of the bar on the external part of the coil.

Figure 8:
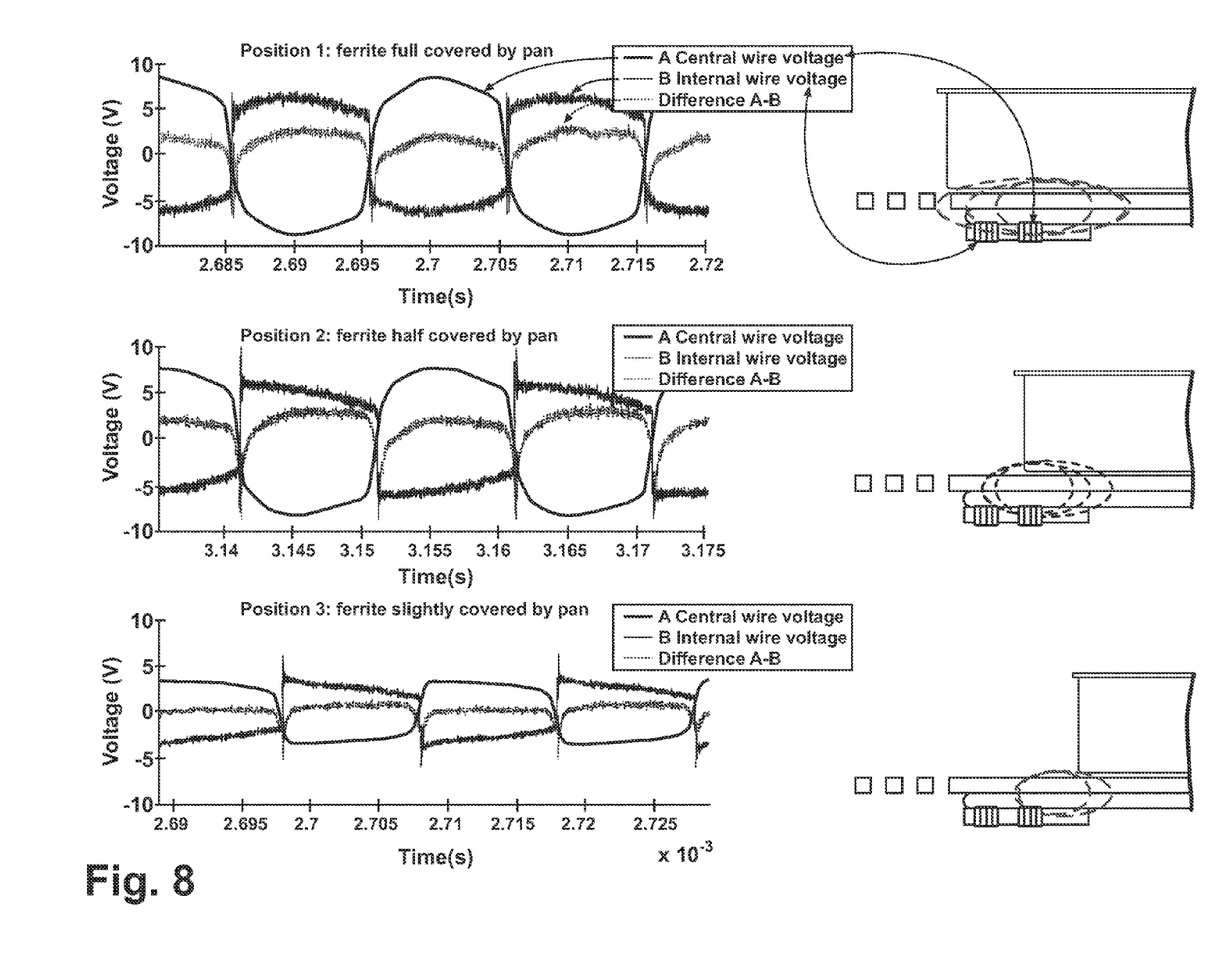
FIG. 8 shows the induced voltage variations according to the embodiment of FIG. 7.

FIG. 8 shows a measurement of the induced voltages at wire terminals for three different positions of the pan (coil diameter, drive frequency and other factors except pan position remain constant). Each plot shows central wire voltage ($V_{cen}$), external wire voltage ($V_{ext}$), and the difference between the two voltage signals, defined as:

$$V_{diff} = |V_{center} - V_{external}|$$

In the upper configuration of FIG. 8 (position A), the pan covers both wirings on the ferrite bar. In the middle configuration (position B), the pan covers central wiring only. In the configuration at the bottom of FIG. 8 (position C), the pan does not cover any wiring on the ferrite bar.

Waveforms of FIG. 8 show that it is possible to differentiate position A, position B and position C.

At position A: central sensor output voltages show a sine-type waveform. Instead, external output voltage resembles more to a square signal.

At position B: central output voltage remains unchanged. Instead external voltage shows sharp peak values at both rise and fall time instant.

At position C: both central and external output voltage signals has the same form with sharp peak value at both rise and fall time instant.

Figure 9:
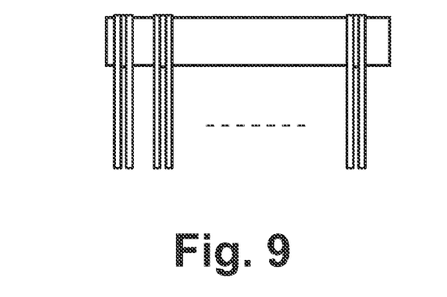
FIG. 9 is a schematic view similar to FIG. 7, showing a variant of such embodiment.

The resolution of this pan position method can be increased by adding N sensors, as shown in FIG. 9.

A ferrite bar with N magnetic flux sensors can detect N−1 pan positions along the coil variation. The generalized criterion is:

if $V_{diff_x} = |V_k - V_{k+1}| <$ threshold $\Rightarrow$ pan is not within wirings k and k+1 of N if $V_{diff_x} = |V_k - V_{k+1}| >$ threshold $\Rightarrow$ pan is within wirings k and k+1 of N measuring all N−1 values of $V_{diff_x}$, pan position can be determined Other values can be used for using the above criterion, for e.g. the mean value of absolute module of sensor voltage difference, etc.

According to a third embodiment of the present invention, more than one ferrite bar is provided with a magnetic sensor. For example, assuming that the pan has a circular surface, the minimum number of sensing ferrite bars needed to estimate accurately the pan coordinates is two: coordinates will be calculated respect the two ferrite's axis. Bars have to be under opposite halves of the coil and not in line between them. The most efficient disposition is an angle of 120° between the sensing bars, has shown in FIG. 10.

Figure 10:
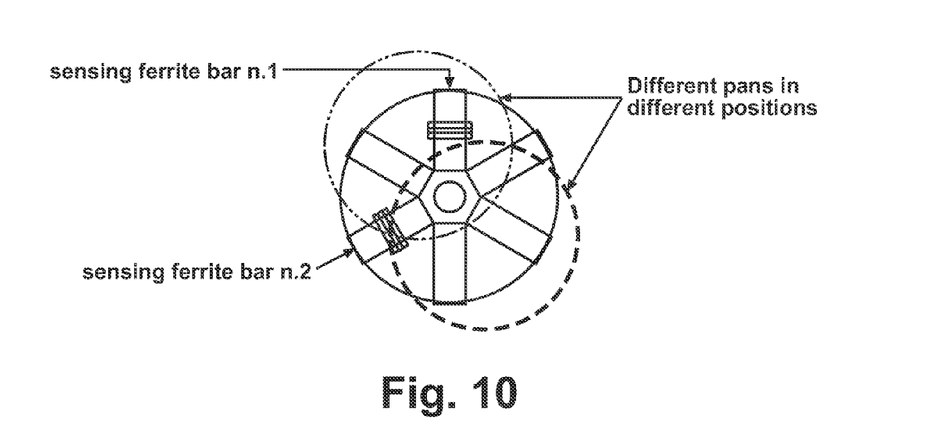
FIG. 10 is a schematic view of a third embodiment of the invention showing the disposition of two sensing ferrite bars for pan coordinates detection.

Assuming that the ferrite bars and the magnetic flux sensors are equal and that the structure has a perfect radial symmetry in respect to the center of the coil, the relative coil covering (i.e. the mismatching between coil pot) of the two sensing ferrite bars can be calculated by estimating the pan position on each ferrite's axis:

$$\begin{cases} \text{Pan\_position}_{axis1} = k_1 \cdot V_{bar1_{RMS}} + q_1 & \text{pan edge coordinate on bar 1 axis} \\ \text{Pan\_position}_{axis2} = k_2 \cdot V_{bar2_{RMS}} + q_2 & \text{pan edge coordinate on bar 2 axis} \end{cases}$$

Covering ratio for estimating center/off center:

$$\text{Covering\_ratio} = \frac{\text{Pan\_position\_axis1}}{\text{Pan\_position\_axis2}}$$

if Covering_ratio ≈ 1 $\Rightarrow$ pan is centered above the coil if Covering_ratio << 1 $\Rightarrow$ pan is decentralized in the direction of sensor 1 if Covering_ratio >> 1 $\Rightarrow$ pan is decentralized in the direction of sensor 2

Figure 11:
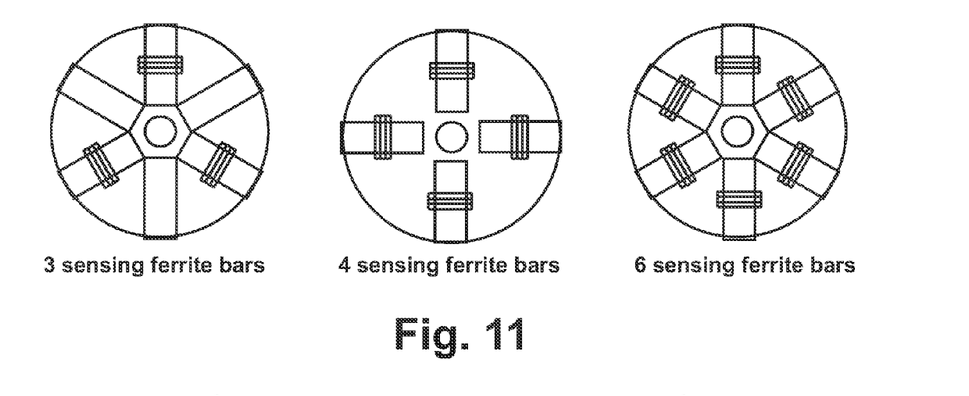
FIG. 11 is similar to FIG. 10 and shows the disposition of three, four and six sensing ferrite bars for pan coordinates detection.

If N sensing bars are used, the best disposition is to distribute the sensors evenly around the coil (angle ∼=360°/N). FIG. 11 shows the example of three, four and six sensing ferrite bars under a coil.

According to a fourth embodiment of the present invention, multiple sensing ferrite bars are used, each bar with more than one sensor.

Both solutions of second and third embodiment can detect pan size and position under every work condition and with robustness to noise factors, but the precision of such detection can be improved. This goal is achieved according to the fourth embodiment of the invention, by mixing both solutions, i.e. by using multiple sensing ferrite bars, each one with more than one sensor.

In this way, the absolute coordinates on each radius of the coil covered with a sensing ferrite are known precisely, allowing a direct detection of the coil area covered by the pan. If enough sensors are present, the system can also detect pan shapes different from circular ones.

Figure 12:
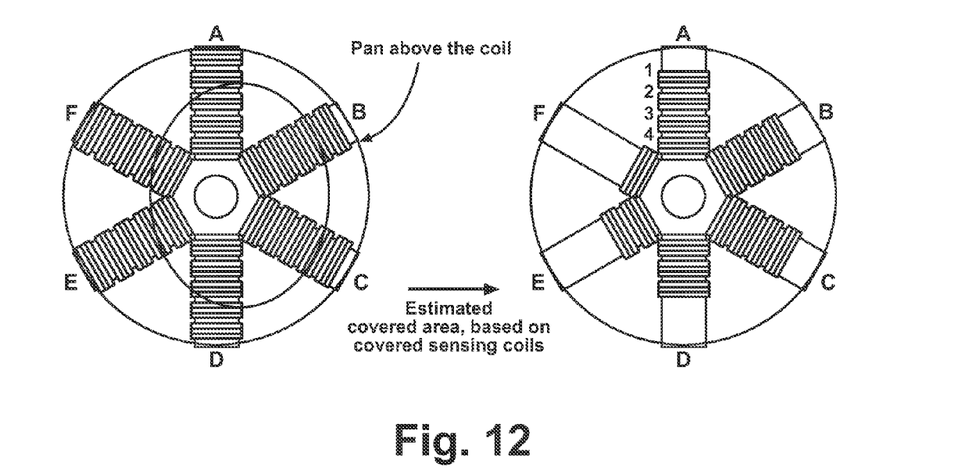
FIG. 12 shows a fourth embodiment of the invention, in which the coil is provided with several ferrite bars, each equipped with several auxiliary detecting circuits.

FIG. 12 shows an example of multiple sensing ferrite bars (six), each one with multiple sensors (five).

In the upper part of FIG. 12 the position of the pan is shown. In the bottom part of FIG. 12 it is shown which of the sensor circuits are actually detecting the pan: on bar A, the sensors A2, A3, A4 and A5, where with the numbers are progressively indicated the sensors from the outside of the coil; on bar B, the sensor B2, B3, B4 and B5; on bar C, the sensor C2, C3; C4 and C5.

The signals obtained from the sensing circuits, i.e. the circuits comprising the wires wrapped around the ferrite bars, may have several applications in addition to pan size and position detection. So far several methods of design & use of sensor of the ferrite bar magnetic field have been presented, here below some further applications.

Pan size can help estimate the whole pan dimensions that can serve for the special function like boiling control. Another branch of control improvements concerns power supply. This is especially true for heating modes where the pan receives power from multiple induction coils. By knowing the covering ratio of the coils, control system can determine the most efficient ratio of power supply on the coils for a given total power. A typical problem of all configurations of pan heated by multiple coils is the temperature homogeneity on the pan surface, which can greatly affect the food contained therein. If the pan is not well centered above the coils, then the temperature of the pan surface above one of the coil could be much different than the temperature of the pan surface above the other coil.

Figure 13:
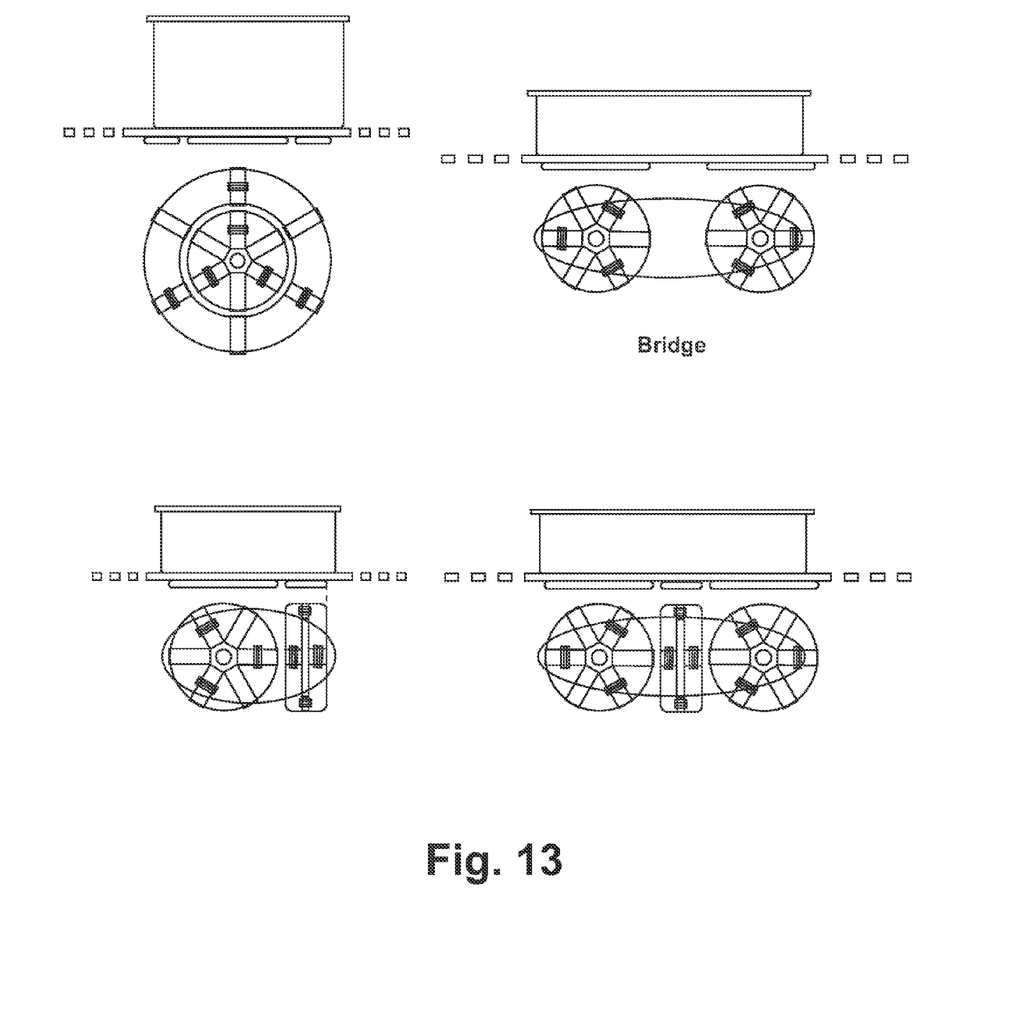
FIG. 13 shows the application of the present invention to a typical configuration of pan heated by multiple coils with sensing ferrite bars.

FIG. 13 shows some typical configurations of pan heated by multiple coils. For example, if a total power of 2000 W is requested, power is equally shared between two coils (=each coil supplies 1000 W), but the pan covers 30% of the surface of one coil and 70% of the surface of the other coil, and therefore the power density versus surface on the first coil (that supplies 1000 W on a small surface) will be much greater than the power density on the second coils (that supplies 1000 W on a surface more than double): as a consequence, the temperature on the part of the pan above the first coil will be much greater than the other part of the pan. This problem can be avoided by measuring the covering ratio of the coils with a method according to the present invention.

By knowing the covering ratio of the coils, control system can guarantee a balanced power supply on the whole surface of the pan, by supplying a specific power $P_k$ for each coil. The method is carried out according to the following equations:

$$\begin{cases} P_{tot} = \text{total power to be supplied to the pan} \\ \text{Covering\_ratio}_k = \dfrac{\text{surface of coil } k \text{ covered by the pan}}{\text{total coils surface covered}} \\ \sum_{k=1}^{n} \text{Covering\_ratio}_k = 1 \\ P_k = P_{tot} \cdot \text{Covering\_ratio}_k \end{cases}$$

where $P_k$ is the power to be supplied to the pan by coil k.

Figure 14:
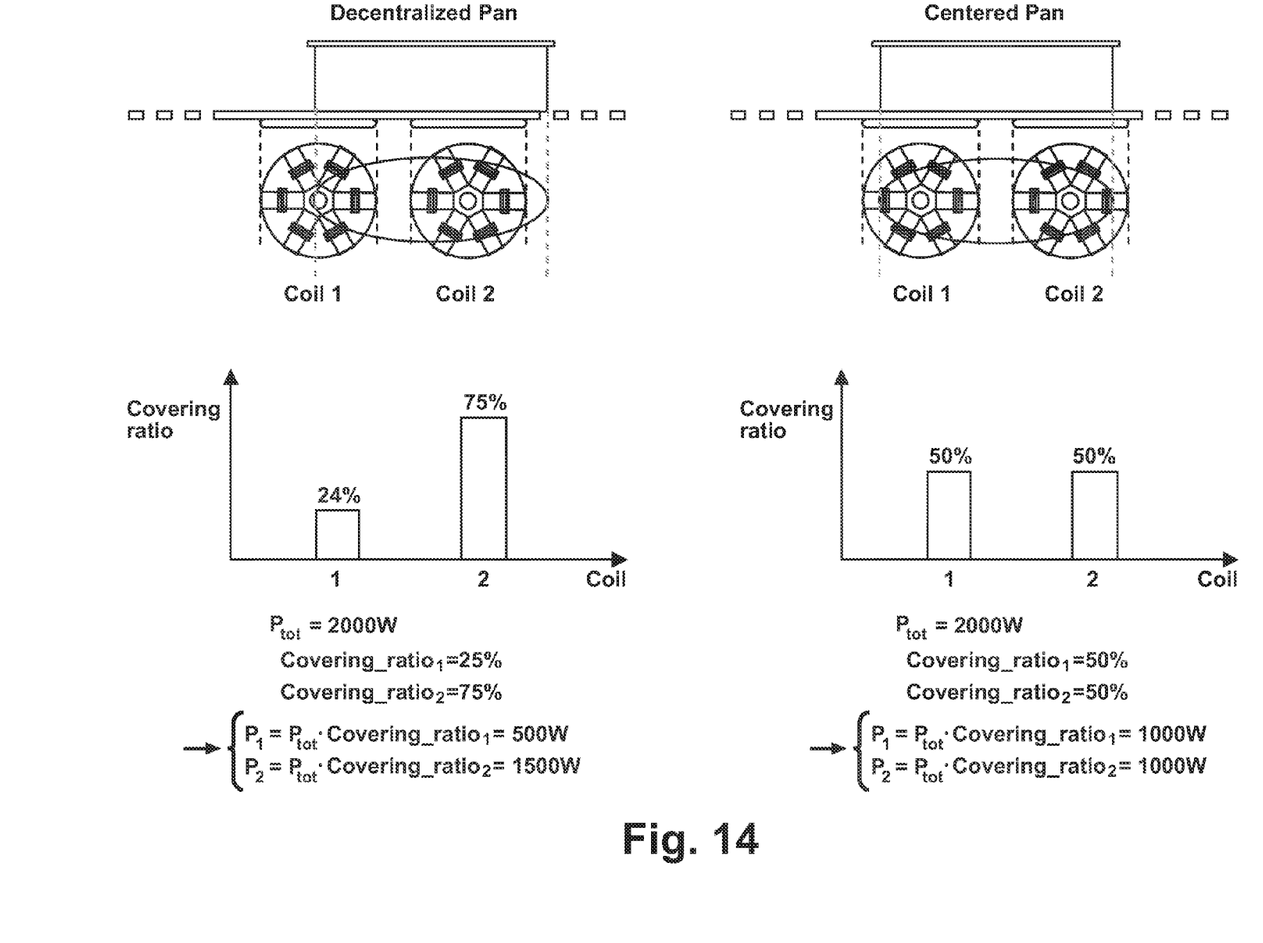
FIG. 14 shows the application of the present invention to two adjacent induction coils in which power supply id balanced.

FIG. 14 shows an example of power supply balancing with two coils.

Classical pan detection methods based on electrical parameters of the power converter are not adapted or they are inadequate to estimate pan size and position precise enough for real life applications.

The invention presents an original method to estimate accurate pan size and/or position, by measuring the magnetic field linked to the ferrite bars commonly used in induction coils. A method to calculate the covering ratio of N induction coils by a single pan is presented as well.

The main benefit for configurations with multiple coils supplying power to the same pan is a well known solution for guaranteeing homogeneous temperature on the pan surface. The invention presents an inexpensive technique to supply balanced power on the pan, regardless to its position.

Other benefits of measuring pan size and position is to allow special control functions requiring the measurement of pan size and position to be implemented: temperature control, boil detection, frying control, and user alerting.

The invention claimed is:

1. A method for allocating power in induction cooking hobs having two or more laterally spaced, non-overlapping induction coils associated with a heating area for heating separate areas on a bottom surface of a cooking vessel, the method comprising:
    sensing and assessing electrical parameters of sensing circuits associated with respective ones of the induction coils correlated to variation of magnetic flux; and
    allocating power to the two or more induction coils based on the electrical parameters of the sensing circuits to balance heat provided to the bottom surface of the cooking vessel in order to minimize a temperature difference between the separate areas.

2. The method according to claim 1, wherein a first of the induction coils is associated with a plurality of magnetic field concentrators wherein the sensing circuit associated with the first of the induction coils is associated with at least one of the magnetic field concentrators.

3. The method according to claim 2, wherein each of the magnetic field concentrators is provided with a sensing circuit.

4. The method according to any of the claim 2, wherein each magnetic field concentrator is provided with at least two sensing circuits placed at different positions.

5. The method according to claim 2, wherein the plurality of magnetic field concentrators comprise ferrite bars.

6. The method according to claim 1, wherein a first of the sensing circuits comprises a wire wrapped around a magnetic field concentrator.

7. The method according to claim 1, wherein a first of the electrical parameters is at least one of an output induced mean voltage, a voltage peak-to-peak, a voltage signal phase, a voltage root means square, a voltage root mean square on a time interval around its peak value, or a combination thereof.

8. The method of claim 1, further comprising:
    balancing the supply of power to each coil of the two or more coils according to the following equations:

$$\begin{cases} P_{tot} = \text{total power to be supplied to the pan} \\ \text{Covering\_ratio}_k = \dfrac{\text{surface of coil } k \text{ covered by the pan}}{\text{total coils surface covered}} \\ \sum_{k=1}^{n} \text{Covering\_ratio}_k = 1 \\ P_k = P_{tot} \cdot \text{Covering\_ratio}_k \end{cases}$$

9. The method of claim 1, further comprising:
    calculating a total power applied to the cooking vessel;
    determining a covering ratio for each coil based on an area of each coil covered by the cooking vessel; and
    allocating power for each coil based on the covering ratio.

10. An induction cooking hob comprising:
    two or more laterally spaced, non-overlapping induction coils associated with a heating area for heating separate areas on a bottom surface of a cooking vessel; and
    a control circuit having sensing circuits for respective ones of the induction coils connected to the control circuit to provide electrical parameters correlated to variation of magnetic flux, the control circuit being configured to allocate power to the two or more induction coils based on the electrical parameters of the sensing circuits to balance heat provided to the bottom surface of the cooking vessel in order to minimize a temperature difference between the separate areas.

11. The induction cooking hob according to claim 10, further comprising a plurality of magnetic field concentrators wherein the sensing circuits are associated with respective ones of the magnetic field concentrators.

12. The induction hob according to claim 11, wherein two of the magnetic field concentrators are positioned at an angle of about 120° with reference to a coil center.

13. The induction hob according to claim 11, wherein each magnetic field concentrator is provided with at least two sensor circuits placed at different positions.

14. The induction hob of claim 11, wherein the plurality of magnetic field concentrators comprise ferrite bars.

15. The induction hob according to claim 10, wherein a first of the sensing circuits comprises a wire wrapped around a magnetic field concentrator.

16. The induction cooking hob according to claim 10, wherein said control circuit is further configured to balance the supply of power for each of the two or more coils according to the following equations:

$$\begin{cases} P_{tot} = \text{total power to be supplied to the pan} \\ \text{Covering\_ratio}_k = \dfrac{\text{surface of coil } k \text{ covered by the pan}}{\text{total coils surface covered}} \\ \sum_{k=1}^{n} \text{Covering\_ratio}_k = 1 \\ P_k = P_{tot} \cdot \text{Covering\_ratio}_k. \end{cases}$$

17. The induction cooking hob according to claim 10, wherein said control circuit is further configured to:
   calculate a total power applied to the cooking vessel;
   determine a covering ratio for each coil based on an area of each coil covered by the cooking vessel; and
   allocate power for each coil based on the covering ratio.

\* \* \* \* \*